US009533410B2

(12) United States Patent
Chiang et al.

(10) Patent No.: US 9,533,410 B2
(45) Date of Patent: Jan. 3, 2017

(54) FOLDABLE STAND

(71) Applicant: Rexon Industrial Corp., Ltd., Taichung (TW)

(72) Inventors: Wen Chin Chiang, Taichung (TW); Chun Che Chen, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 0 days.

(21) Appl. No.: 14/969,666

(22) Filed: Dec. 15, 2015

(65) Prior Publication Data

US 2016/0167217 A1 Jun. 16, 2016

(30) Foreign Application Priority Data

Dec. 16, 2014 (TW) ............................ 103143928 A

(51) Int. Cl.
*F16M 11/38* (2006.01)
*B25H 1/00* (2006.01)

(52) U.S. Cl.
CPC .................................. *B25H 1/0042* (2013.01)

(58) Field of Classification Search
CPC ........... B25H 1/04; B25H 1/14; B25H 1/0042; B23D 57/0092
See application file for complete search history.

(56) References Cited

U.S. PATENT DOCUMENTS 5,087,013 A * 2/1992 Gress ....................... B23Q 9/00 248/129
5,560,582 A * 10/1996 Beelen ..................... B25H 1/00 248/439
6,607,015 B1 8/2003 Chen
6,942,229 B2 9/2005 Brazell et al.
7,584,935 B2 9/2009 Chen
7,882,870 B2 * 2/2011 Lee .......................... B25H 1/04 144/286.1
8,910,970 B2 * 12/2014 Chen ........................ B25H 1/04 280/652
9,149,926 B2 * 10/2015 Chen ........................ B25H 1/04
9,186,736 B1 * 11/2015 Chang ................ B23D 57/0092

FOREIGN PATENT DOCUMENTS

TW I289101 11/2007

* cited by examiner

*Primary Examiner* — Amy Sterling
(74) *Attorney, Agent, or Firm* — Bacon & Thomas, PLLC

(57) ABSTRACT

A foldable stand includes two stand legs pivotally connected together. A positioning unit is set between the two stand legs and includes a first link pivotally connected to a second link, a locating plate mounted in the first link and a locking pin mounted in the second link. The foldable stand also includes a control unit having a first pedal mounted at the second link and pressable to move the first and second links toward each other into a folded position. In the folded position, the locking pin is forced into engagement with the locating plate. A second pedal is pivotally connected to the second link and pressable to pull the locking pin out of the locating plate for enabling the two stand legs to be biased from the folded position to an extended position.

8 Claims, 7 Drawing Sheets

FOLDABLE STAND

BACKGROUND OF THE INVENTION

1. Field of the Invention

The present invention relates to cutting tool stands, and more particularly to a foldable cutting tool stand.

2. Description of the Related Art

In order to facilitate delivery between different workplaces, machine tool stands for regular small-scale machine tools commonly have a folding design so that the stands can be alternatively set between an extended position and a folded position.

Various machine tool stands are known. For example, Taiwan Patent I289101 teaches the use of a pedal to move four links, forcing these four links to carry one respective wheel seat in lifting the base from the floor. The wheel seats must have enough structural strength so that the expected effects can be achieved. Further, U.S. Pat. No. 6,607,015 discloses a foldable worktable. This foldable worktable is functional, however, it is still not convenient for use because the two H-shaped legs of this design of the foldable worktable are not equipped with rollers for convenient movement with the machine tool when the foldable worktable is folded up. Further, U.S. Pat. No. 6,942,229 discloses a collapsible stand for a bench-top power tool. This design of the collapsible stand has a pair of wheels rotatably connected to the base thereof for transporting the stand and power tool thereupon. However, when in use, the stand must be turned to a position perpendicular to the floor so that the support legs can be collapsed. However, because the weight of the machine tool supported thereon is much larger than the stand itself, when biasing the component parts of the stand, it is likely to cause danger to the operator.

SUMMARY OF THE INVENTION

The present invention has been accomplished under the circumstances in view. It is therefore the main object of the present invention to provide a foldable stand, which facilitates operation and ensures a high level of operation safety and structural stability.

To achieve this and other objects of the present invention, a foldable stand comprises a support unit, a positioning unit, and a control unit. The support unit comprises a first stand leg and a second stand leg. The first stand leg and the second stand leg are crossed and pivotally connected with each other so that the first stand leg and the second stand leg can be moved between an extended position and a folded position. The positioning unit comprises a first link, a second link, a locating plate, a locking pin and a guide pin. The first link has one end thereof pivotally connected with one end of the second link. The first link and the second link each have respective opposite ends thereof respectively pivotally connected to the first stand leg and the second stand leg. The second link comprises a guide slot. The locating plate is mounted inside the first link, defining therein a locating hole. The locking pin is connected to the second link by the guide pin. The guide pin is inserted through and movable along the guide slot. The locking pin comprises a positioning end. The positioning end of the locking pin is disengaged from the locating hole of the locating plate when the first stand leg and the second stand leg are disposed in the extended position. The locking pin is inserted into the locating hole of the locating plate when the stand leg and the second stand leg are disposed in the folded position. The control unit comprises a first pedal and a second pedal. The first pedal is connected to one end of the second link remote from the first link, and adapted for biasing the second link toward the first link. The second pedal has one end thereof pivotally connected to the second link, and an opposite end thereof connected to the guide pin such that the second pedal is operable to cause the guide pin to carry the locking pin away from the locating hole of the locating plate.

Further, the locating plate comprises a transverse wall connected to the first link, a vertical wall downwardly extended from one end of the transverse wall and having the locating hole defined therein, and a sloping wall obliquely downwardly extended from a bottom end of the vertical wall remote from the transverse wall. Thus, when the first stand leg and the second stand leg are biased from the extended position to the folded position, the sloping wall of the locating plate will gradually push the positioning end of the locking pin. As soon as the sloping wall of the locating plate passes over the positioning end of the locking pin, the locking pin is forced by the spring member to engage the positioning end into the locating hole of the locating plate, locking the first stand leg and the second stand leg in the folded position.

Other advantages and features of the present invention will be fully understood by reference to the following specification in conjunction with the accompanying drawings, in which like reference signs denote like components of structure.

Figure 1:
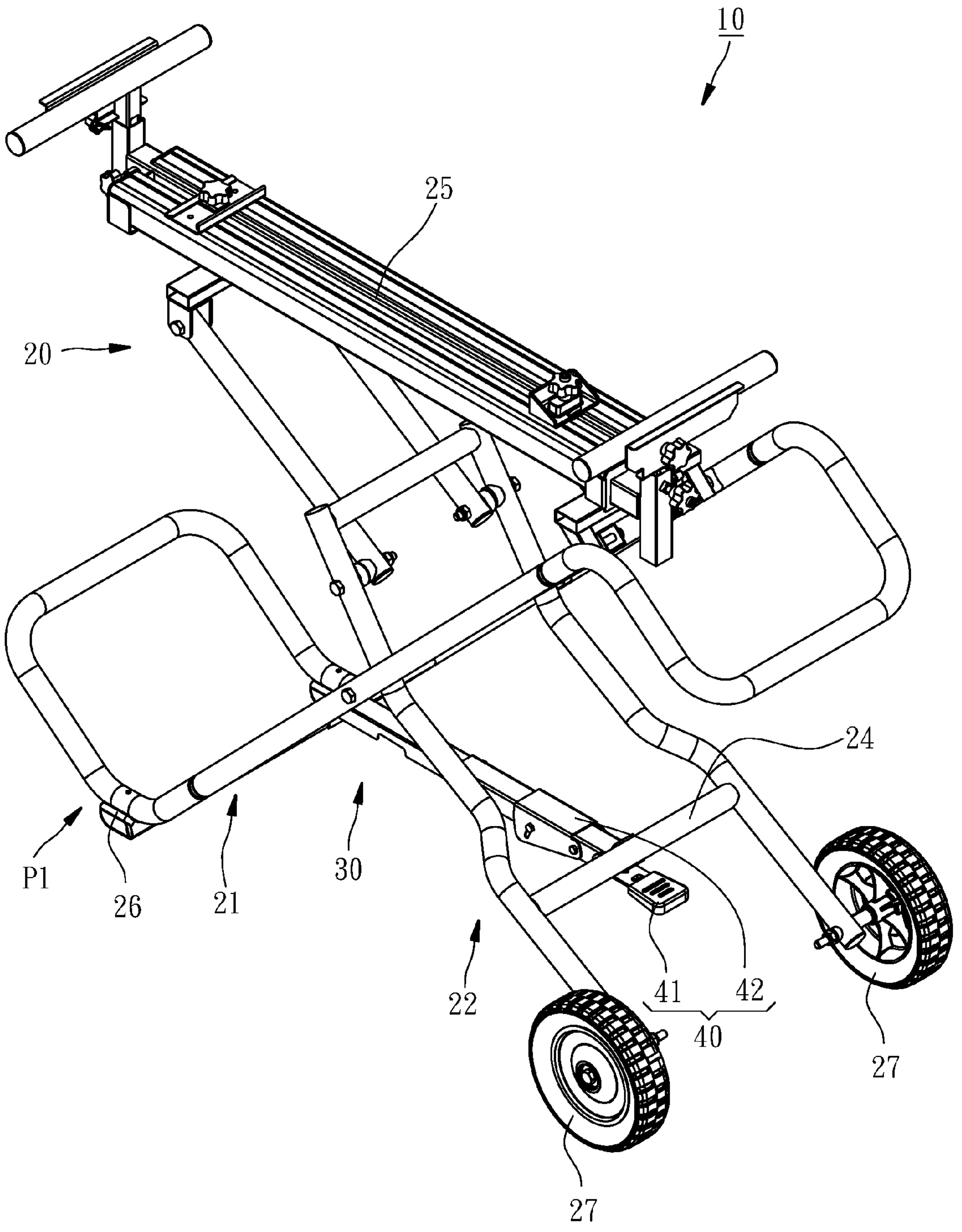
FIG. 1 is a perspective view of a foldable stand in accordance with the present invention.

It should be noted that the drawing figures are not necessarily drawn to scale, but instead are drawn to provide a better understanding of the components thereof, and are not intended to be limiting in scope, but rather to provide exemplary illustrations. It should further be noted that the figures illustrate an exemplary embodiment of the present invention and the components thereof, and in no way limits the structures, configurations and components thereof according to the present disclosure.

DETAILED DESCRIPTION OF THE INVENTION

Figure 2:
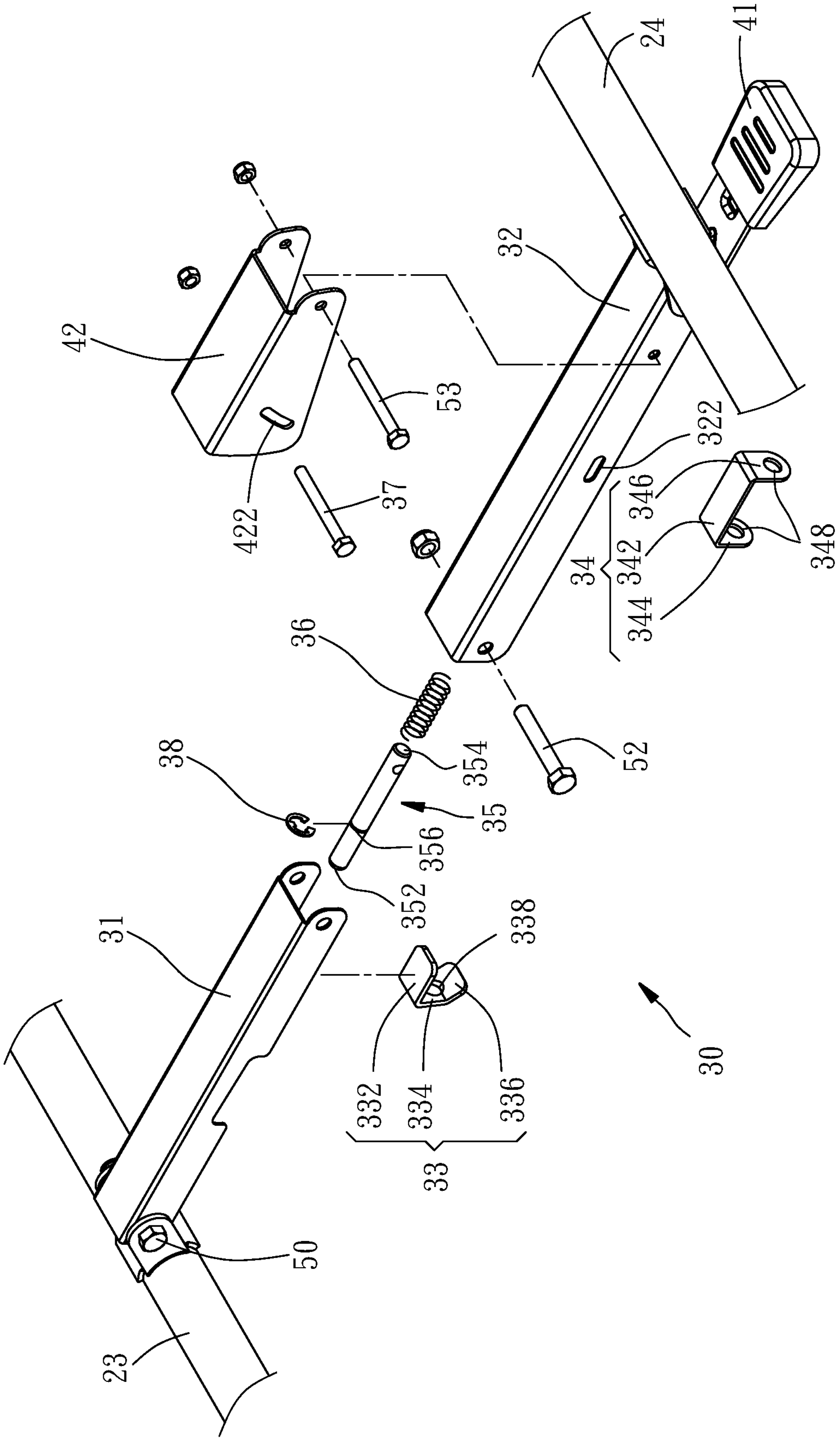
FIG. 2 is an exploded view of a part of the foldable stand in accordance with the present invention.

Referring to FIGS. 1 and 2, a foldable stand in accordance with the present invention is shown. As illustrated, the foldable stand 10 comprises a support 20, a positioning unit 30, and a control unit 40.

The support 20 comprises a first stand leg 21 and a second stand leg 22. The first stand leg 21 and the second stand leg 22 are crossed and pivotally connected with each other so that the first stand leg 21 and the second stand leg 22 can be moved between an extended position P1 and a folded position P2. Further, the first stand leg 21 comprises a first crossbar 23 transversely located near a bottom end thereof. The second stand leg 22 comprises a second crossbar 24 transversely located near a bottom end thereof. The support 20 further comprises a carrier platform 25, two supporting pads 26, and two rollers 27. The carrier platform 25 is mounted at respective top ends of the first and second stand legs 21,22 for supporting a cutting tool (not shown). The two supporting pads 26 are mounted at an opposing bottom end of the first stand leg 21 for direct contact with the floor. The two rollers 27 are bilaterally pivotally mounted at an opposing bottom end of the second stand leg 22 for the moving of the support unit 20 and the loaded cutting tool.

Figure 3:
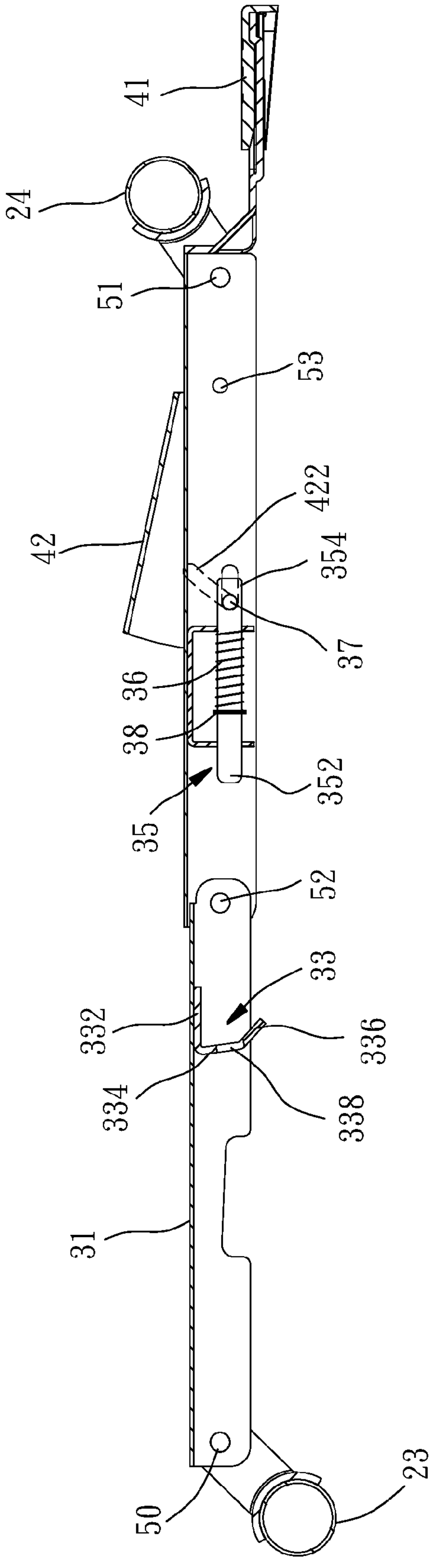
FIG. 3 is a sectional view of a part of the control unit of the foldable stand in accordance with the present invention, illustrating the first link and the second link extended out.

As illustrated in FIGS. 2 and 3, the positioning unit 30 comprises a first link 31, a second link 32, a locating plate 33, a pin holder 34, a locking pin 35, and a spring member 36.

The first link 31 has one end thereof pivotally connected to the first crossbar 23 of the first stand leg 21 by a first pivot pin 50. The second link 32 has one end thereof pivotally connected to the second crossbar 24 of the second stand leg 22 by a second pivot pin 51. Further, the first link 31 has an opposite end thereof pivotally connected with an opposite end of the second link 32 with a third pivot pin 52. Further, the second link 32 comprises a guide slot 322 located on a middle part thereof and extending along the length of the second link 32.

The locating plate 33 is mounted in the first link 31, comprising a transverse wall 332, a vertical wall 334 and a sloping wall 336. The transverse wall 332 is connected to an inside wall of the first link 31. The vertical wall 334 extends downwardly from one end of the transverse wall 332, having a locating hole 338 defined therein. The sloping wall 336 extends obliquely downwardly from a bottom end of the vertical wall 334 remote from the transverse wall 332.

The pin holder 34 is mounted in the second link 32, comprising a top wall 342 and two opposite end walls 344,346. The top wall 342 is connected to an inside wall of the second link 32. The two end walls 344,346 are respectively perpendicularly extended from two opposite ends of the top wall 342, each defining therein a through hole 348.

The locking pin 35 is inserted through the two through holes 348 of the pin holder 34, and comprises a positioning end 352 and a connection end 354. The positioning end 352 and the connection end 354 respectively extend out of the end walls 344,346. Further, the connection end 354 is connected to the second link 32 by a guide pin 37. The guide pin 37 is inserted through the guide slot 322 of the second link 32, enabling the locking pin 35 to be moved with the guide pin 37 along the guide slot 322. Further, the locking pin 35 comprises a retaining groove 356 extended around the periphery thereof on the middle. Further, a retaining ring 38 is fastened to the retaining groove 356.

The spring member 36 is mounted around the locking pin 35 and stopped between one end wall 346 of the pin holder 34 and the retaining ring 38 for imparting an elastic restoring force to the locking pin 35 toward the locating plate 33.

The control unit 40 comprises a first pedal 41 and a second pedal 42. The first pedal 41 is connected to one end of the second link 32 remote from the first link 31. The second pedal 42 is covered over a top wall of the second link 32, having one end thereof pivotally connected to the second link 32 by a fourth pivot pin 53 and an opposite end thereof provided with an arched slot 422 for the passing of the guide pin 37.

Figure 4:
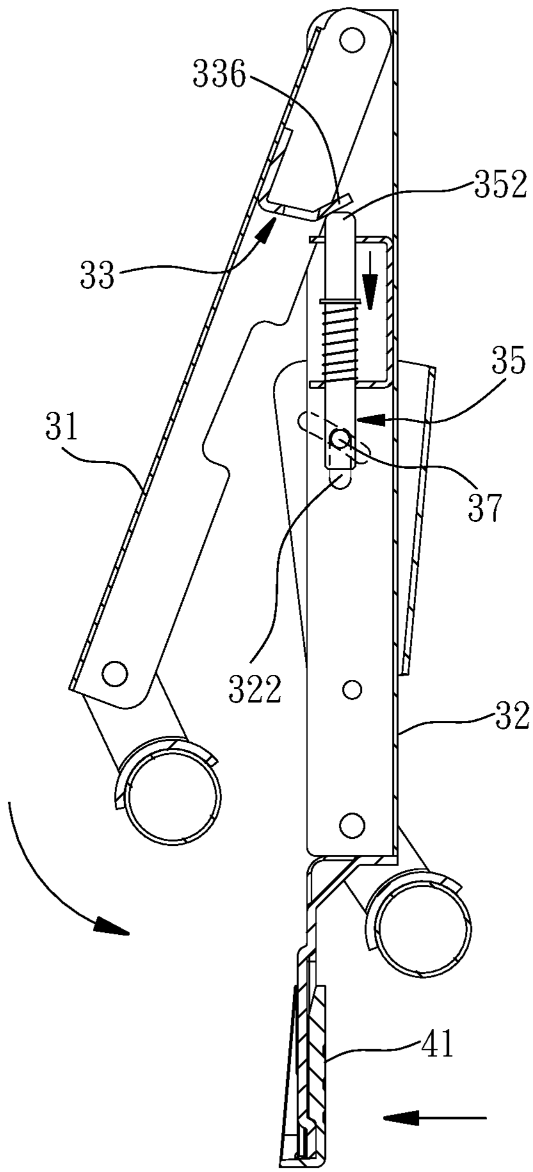
FIG. 4 is similar to FIG. 3, illustrating a folding action of the first link and the second link.
Figure 5:
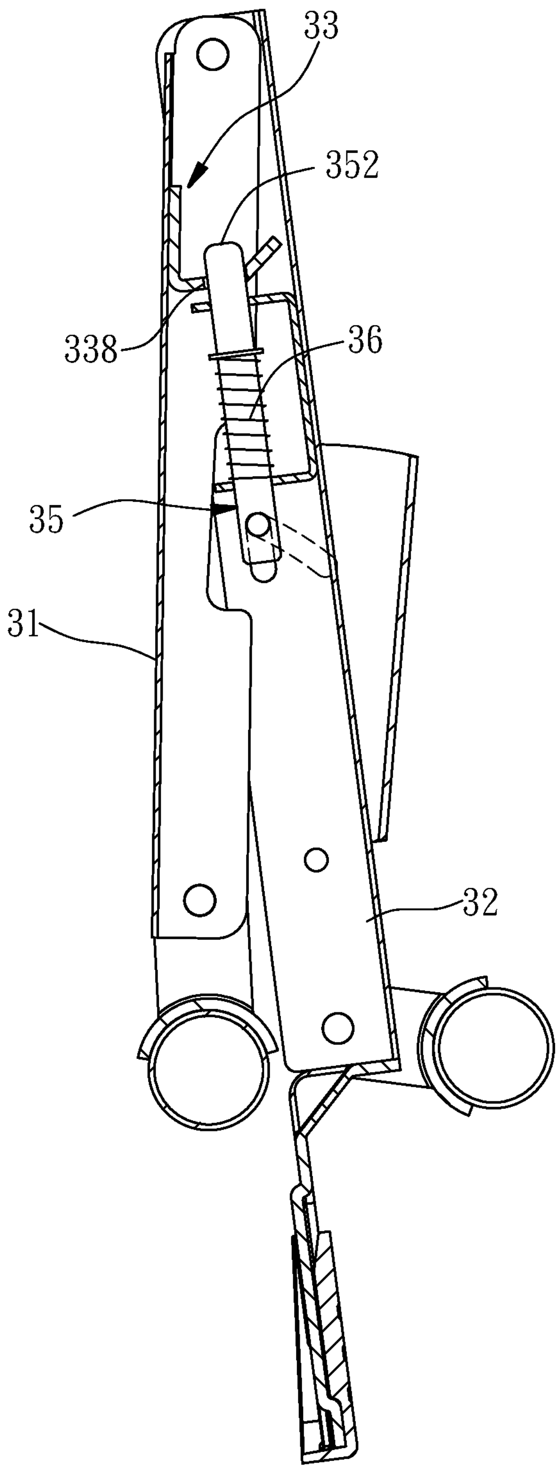
FIG. 5 is similar to FIG. 4, illustrating the first link and the second link fully folded up.
Figure 6:
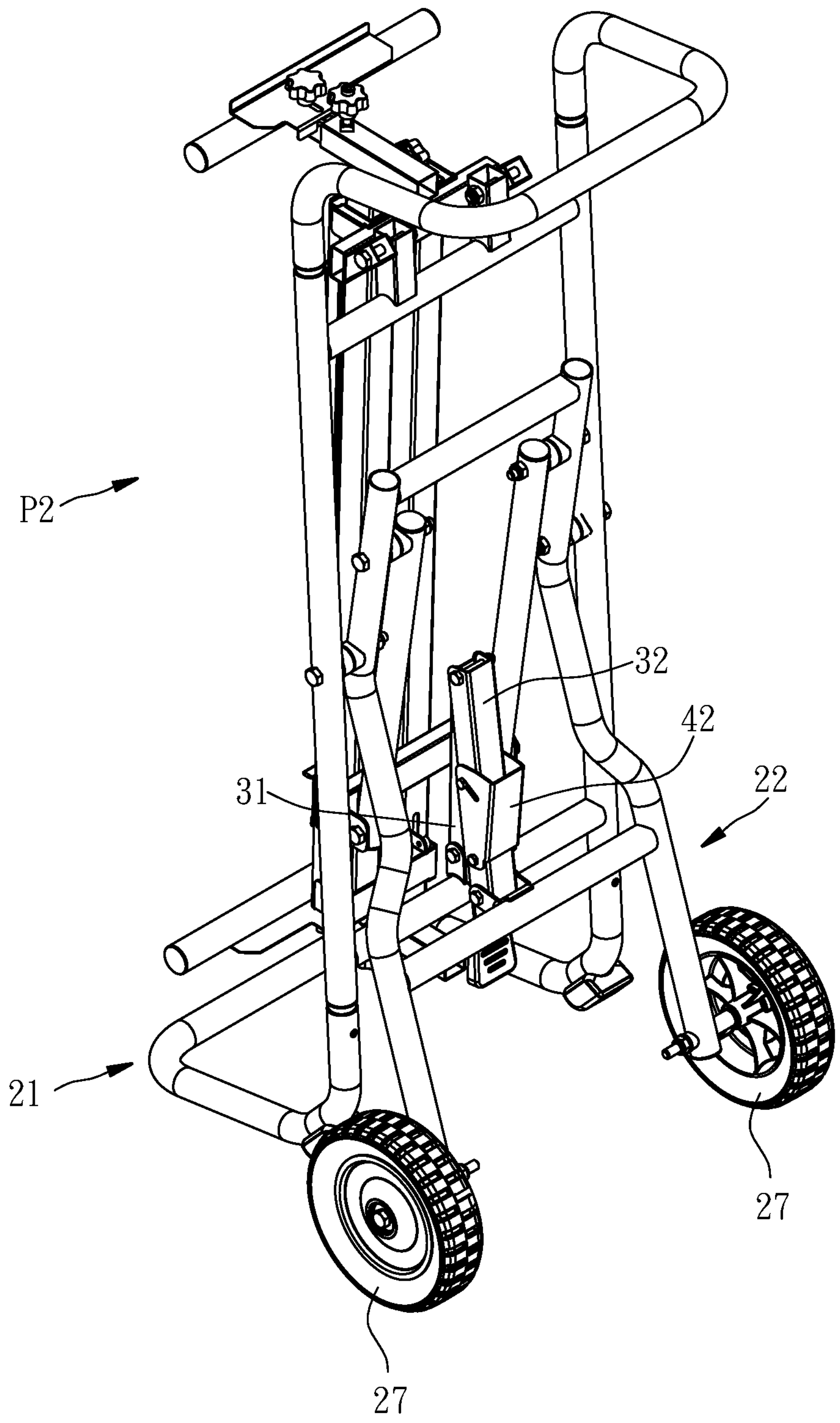
FIG. 6 is a perspective view of the present invention, illustrating the foldable table in the folded position.

From the structure described above, it can be clearly seen that to fold up the first stand leg 21 and the second stand leg 22, a user presses the first pedal 41 with one foot and simultaneously pushes the first stand leg 21 upward to bias the first stand leg 21 and the second stand leg 22 toward each other. When the first stand leg 21 and the second stand leg 22 are being biased toward each other, as illustrated in FIG. 4, the sloping wall 336 of the locating plate 33 is forced to touch and move the positioning end 352 of the locking pin 35, causing movement of the locking pin 35 toward the first pedal 41 in accordance with the relationship between the guide pin 37 and the guide slot 322. At this time, the spring member 36 is compressed by the retaining ring 38 at the locking pin 35 to preserve elastic restoring energy. As soon as the first link 31 and the second link 32 are moved toward each other to the extent that the sloping wall 336 of the locating plate 33 passes over the positioning end 352 of the locking pin 35, the spring member 36 immediately imparts a push force to the locking pin 35 to force the positioning end 352 of the locking pin 35 into the locating hole 338 of the locating plate 33, as illustrated in FIG. 5. As a result, the first and second stand legs 21,22 are positioned in the folded position P2, as illustrated in FIG. 6, subject to engagement between the first and second links 31,32. At this time, by means of the rollers 27, the foldable stand 10 with the loaded cutting tool can be moved to the desired place.

Figure 7:
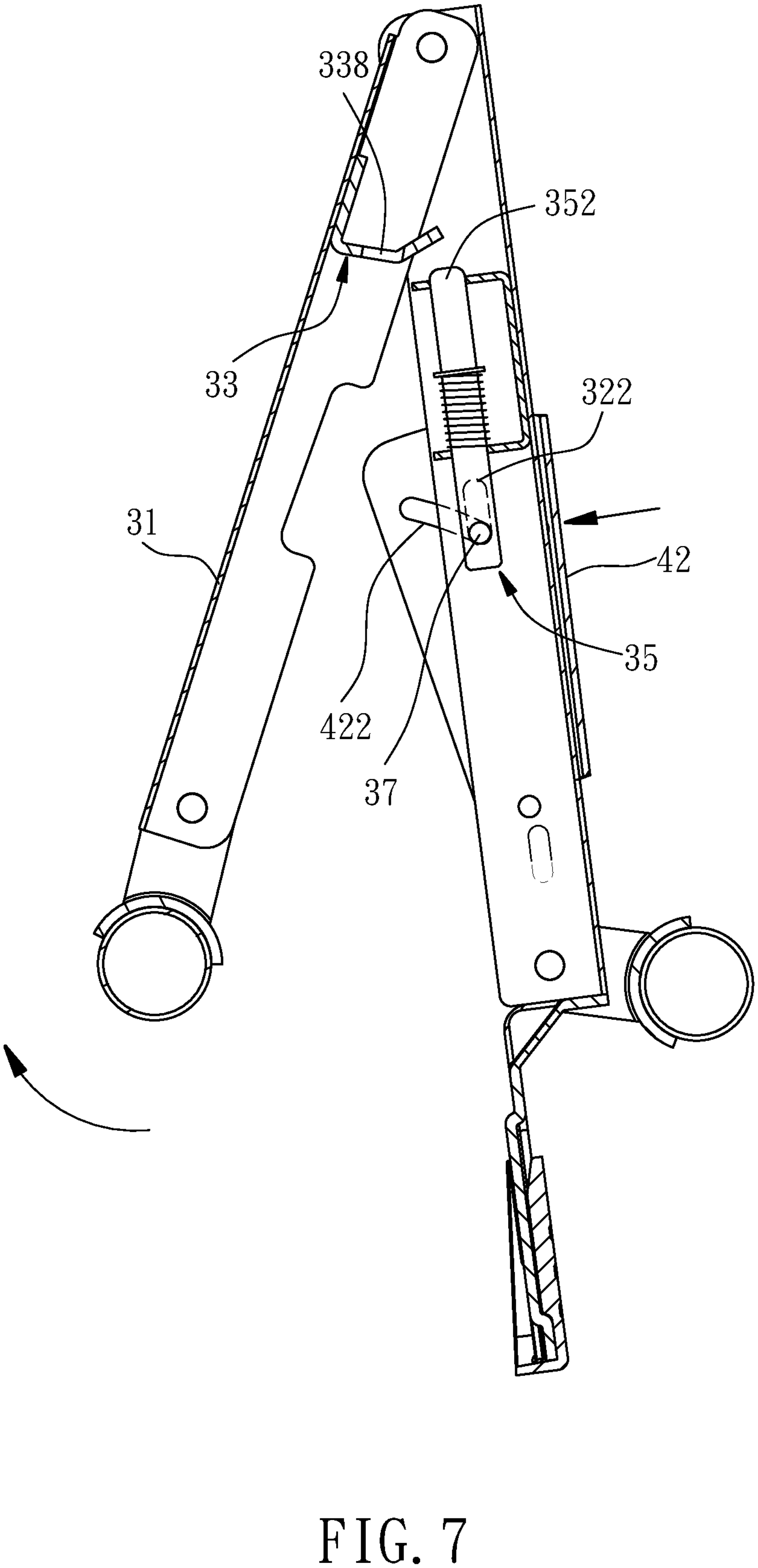
FIG. 7 is similar to FIG. 5, illustrating an extending action of the first link and the second link.

To extend out the first and second stand legs 21,22, a user presses the second pedal 42 to bias the second pedal 42 in the direction toward the second link 32. When the second pedal 42 is being biased, the arched slot 422 is forced to pull the guide pin 37 along the guide slot 322 of the second link 32 in the direction away from the locating plate 33. During movement of the guide pin 37, the locking pin 35 is simultaneously moved to disengage the positioning end 352 from the locating hole 338 of the locating plate 33, thereby releasing the first link 31 and the second link 32 from constraint, as illustrated in FIG. 7. At this time, the first stand leg 21 and the second stand leg 22 can be extended out to the extent where the first link 31 and the second link 32 are kept in horizontal alignment, as illustrated in FIG. 3. Thus, the first stand leg 21 and the second stand leg 22 are set in the extended position P1 (see FIG. 1).

In conclusion, the foldable stand 10 has the first pedal 41 and the second pedal 42 configured for respectively controlling the extending and folding of the first and second links 31,32, and the locking pin 35 and the locating plate 33 arranged for locking or unlocking the first and second links 31,32. When compared to the prior art design, the present invention advantageously simplifies the structure and facilitates extending and folding of the first and second stand legs 21,22 with less effort, thereby avoiding cutting tool flip action and ensuring a high level of operation safety and structural stability, Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A foldable stand, comprising:

a support unit comprising a first stand leg and a second stand leg, said first stand leg and said second stand leg being crossed and pivotally connected with each other such that said first stand leg and said second stand leg are movable between an extended position and a folded position;

a positioning unit comprising a first link, a second link, a locating plate, a locking pin and a guide pin, said first link having one end thereof pivotally connected with one end of said second link, said first link and said second link having respective opposite ends thereof respectively pivotally connected to said first stand leg and said second stand leg, said second link comprising a guide slot, said locating plate being mounted inside said first link and defining therein a locating hole, said locking pin being connected to said second link by said guide pin, said guide pin being inserted through and movable along said guide slot, said locking pin comprising a positioning end, said positioning end of said locking pin being disengaged from said locating hole of said locating plate when said first stand leg and said second stand leg are disposed in said extended position, said locking pin being inserted into said locating hole of said locating plate when said first stand leg and said second stand leg are disposed in said folded position; and a control unit comprising a first pedal and a second pedal, said first pedal being connected to one end of said second link remote from said first link and adapted for biasing said second link toward said first link, said second pedal having one end thereof pivotally connected to said second link and an opposite end thereof connected to said guide pin such that said second pedal is operable to cause said guide pin to carry said locking pin away from said locating hole of said locating plate.

2. The foldable stand as claimed in claim 1, wherein said locating plate comprises a transverse wall connected to said first link, a vertical wall downwardly extended from one end of said transverse wall and having said locating hole defined therein, and a sloping wall obliquely downwardly extended from a bottom end of said vertical wall remote from said transverse wall and adapted for moving said positioning end of said locking pin when said first stand leg and said second stand leg are biased from said extended position to said folded position.

3. The foldable stand as claimed in claim 1, wherein said positioning unit further comprises a spring member mounted at said locking pin and adapted for holding said positioning end of said locking pin in said locating hole of said locating plate when said first stand leg and said second stand leg are disposed in said folded position.

4. The foldable stand as claimed in claim 2, wherein said positioning unit further comprises a spring member mounted at said locking pin and adapted for holding said positioning end of said locking pin in said locating hole of said locating plate when said first stand leg and said second stand leg are disposed in said folded position.

5. The foldable stand as claimed in claim 3, wherein said positioning unit further comprises a pin holder, said pin holder comprising a top wall and two end walls respectively extended from two opposite ends of said top wall, said end walls each having a through hole defined therein; said locking pin is movably inserted through said two through holes of said pin holder, and comprises a retaining groove extended around the periphery thereof and a retaining ring fastened to said retaining groove; said spring member is mounted around said locking pin and stopped between one end wall of said pin holder and said retaining ring of said locking pin.

6. The foldable stand as claimed in claim 4, wherein said positioning unit further comprises a pin holder, said pin holder comprising a top wall and two end walls respectively extended from two opposite ends of said top wall, said end walls each having a through hole defined therein; said locking pin is movably inserted through said two through holes of said pin holder, and comprises a retaining groove extended around the periphery thereof and a retaining ring fastened to said retaining groove; said spring member is mounted around said locking pin and stopped between one end wall of said pin holder and said retaining ring of said locking pin.

7. The foldable stand as claimed in claim 1, wherein said second pedal comprises an arched slot; said guide pin is inserted through said arched slot of said second pedal such that said second pedal is movable to carry said guide pin by said arched slot in moving said locking pin out of said locating hole of said locating plate.

8. The foldable stand as claimed in claim 1, wherein said support unit further comprises a carrier platform mounted at respective top ends of said first stand leg and said second stand leg, two supporting pads bilaterally mounted at a bottom end of said first stand leg, and two rollers bilaterally and pivotally mounted at a bottom end of said second stand leg.

* * * * *